United States Patent [19]

Desjardins

[11] Patent Number: 5,624,731
[45] Date of Patent: Apr. 29, 1997

[54] MULTI-COLOR, MULTI-IMAGE RETROFLECTIVE GONIOCHROMATIC DISPLAY

[76] Inventor: Alexander Desjardins, 251 Washington Ave., Apt. 5R, Brooklyn, N.Y. 11205

[21] Appl. No.: 402,029

[22] Filed: Mar. 10, 1995

[51] Int. Cl.⁶ .................. G02B 5/122; G02B 5/128
[52] U.S. Cl. .................. 428/143; 428/156; 428/149; 428/325; 428/204; 428/29; 428/30; 359/540; 359/529
[58] Field of Search .................. 428/143, 156, 428/149, 325, 204, 29, 30; 359/540, 529

[56] References Cited

U.S. PATENT DOCUMENTS

| | | | |
|---|---|---|---|
| 2,251,386 | 8/1941 | White | 40/583 |
| 2,283,880 | 5/1942 | Heller | 140/92.2 |
| 2,383,884 | 8/1945 | Palmquist | 359/540 |
| 2,411,222 | 11/1946 | Meigs | 40/615 |
| 3,758,192 | 9/1973 | Bingham | 350/105 |
| 3,861,946 | 1/1975 | Waitkins et al. | 106/300 |
| 3,877,786 | 4/1975 | Booras et al. | 350/105 |
| 4,268,117 | 5/1981 | Sevelin | 350/105 |
| 4,763,985 | 8/1988 | Bingham | 350/105 |
| 5,169,707 | 12/1992 | Faykish et al. | 428/195 |
| 5,417,515 | 5/1995 | Hachey et al. | 404/15 |

*Primary Examiner*—William Watkins
*Attorney, Agent, or Firm*—Michael Ebert

[57] ABSTRACT

A display which when illuminated by a light source is adapted to present selectively to an observer colors and images that depend both on the angular position of the observer and on the angular position of the light source relative to the display. The display includes a substrate on which is coated an opaque base layer having a color image printed thereon. Coated over the base layer is an intermediate layer of transparent material having interference pigment particles dispersed therein which impart goniochromatic properties to this layer, the color seen by the observer depending on said angular positions. Overlying the intermediate layer is a retroreflectivity layer formed by transparent beads whereby light reflected from the base layer or from the intermediate layer, as seen by the observer, passes through the retroreflectivity layer to enhance the brilliance of the colors or images presented to the observer.

11 Claims, 3 Drawing Sheets

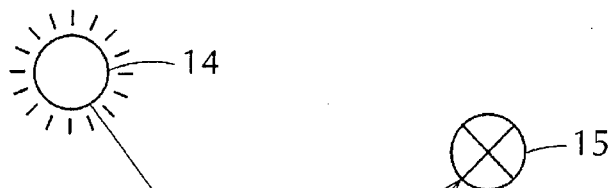
FIG. 7
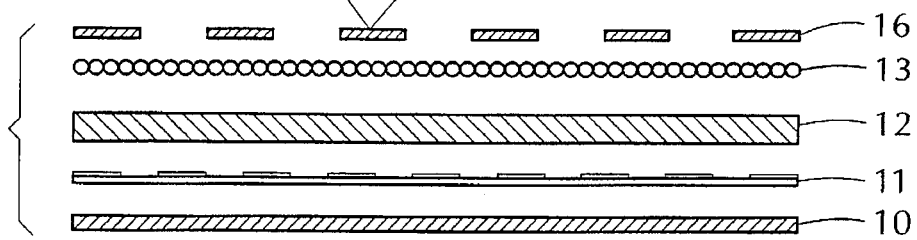
FIG. 8
FIG. 9
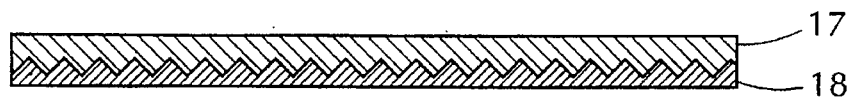

MULTI-COLOR, MULTI-IMAGE RETROFLECTIVE GONIOCHROMATIC DISPLAY

BACKGROUND OF INVENTION

1. Field of Invention

This invention relates generally to a display whose appearance depends both on the angular position of the light source illuminating the display and the angular position of the observer relative to the display, and more particularly to a display adapted to present selectively to the observer colors and images that depend on said angular positions.

2. Status of Prior Art

Retroreflectivity is the term applied to reflection wherein reflected light rays return along paths parallel to those of the corresponding incident rays. This phenomenon is often exploited in highway signs that function to reflect light projected by automobile headlights directly back to the driver of the vehicle.

Thus the White U.S. Pat. No. 2,251,386 discloses a sign in which a layer of glass beads is applied to a painted plate, the beads being in a formation representing a curve in the road. The glass bead layer has retroreflective properties, hence when illuminated by a headlight beam, the driver of the auto sees the illuminated symbol of a curve in the road. In the highway STOP sign shown in the Meigs U.S. Pat. No. 2,411,222, the letters of STOP are each defined by a layer of glass beads, so that when the sign is illuminated, the driver of the vehicle then sees STOP.

It is also known to combine retroreflectivity with color. Thus the Palmquist U.S. Pat. No. 2,383,884 shows a reflector in which a layer of glass beads is adhered by a binder to a colored translucent film attached to a metal reflector to provide colored reflex light reflector sheets and signs. Boora et al. U.S. Pat. No. 3,877,786 discloses a reflex reflective device in which a layer of glass beads is combined with a transparent layer of a color receptive resin. Thus it is known to combine retroreflectivity with color.

In a display in accordance with the invention, the phenomenon of retroreflectivity is combined with that of goniochromatism to selectively produce color and image effects that depend on the angular position both of the light source illuminating the display and the angular position of the observer who views the display.

Goniochromatism is a phenomenon encountered when a surface is coated with luster pigments having light interference properties, such as those disclosed in the Pigment Handbook, Vol. 1, 2nd Edition 1988, John Wiley & Sons, Inc. As pointed out in this Handbook, pearlescent or nacreous pigment particles are transparent platelets of high refractive index which partially transmit light. When the reflecting platelets are in an appropriate thickness, the nacreous pigment then behaves as an interference pigment exhibiting a color play that verges on irridescence.

Light interference arises through interactions between reflections from the upper and lower surfaces of the platelets. When an interference pigment is coated on a white surface, he reflection color is seen in the highlight and the transmission color in the background. The variations in color with the angle of incidence and the angle of observations is referred to as goniochromatism. Hence the color one sees when looking at a goniochromatic layer varies with changes in angular position relative to this layer.

Interference pigments such as those formed from titanium dioxide-coated mica, iron oxide-coated mica and bismuth oxychloride are commercially available from the Mearl Corporation of New York, N.Y. and from other sources.

Inasmuch as the present invention resides in combining retroreflectivity with goniochromatism to create multiple images and changes off colors, of background interest are known types of multiple image techniques. In depthography, two or more images are applied to the back side of a plastic or glass sheet whose front face is etched with fine parallel V-shaped grooves. As a consequence, one image is visible when viewing the sheet at one oblique angle while the other is rendered visible when the sheet is viewed at another angle. This technique is often used in such items as picture postcards depicting two views of a given subject.

Another known process is holography in which a light beam from a laser is split, one half beam being reflected from the subject being photographed and being combined with the other half beam on a photosensitive surface to produce three-dimensional image through light interference. The multiple-image holography process is complex and costly and is limited commercially to relatively small sizes.

SUMMARY OF INVENTION

The main object of this invention is to provide a multi-color, multi-image display which when illuminated by a light source is adapted to present selectively to an observer color effects and images that depend both on the angular position of the light source and the angular position of the observer relative to the display being viewed. Also an object of the invention is to provide techniques for producing a display this type.

More particularly, an object of the invention is to provide a display of the above type in which the phenomenon of retroreflectivity and goniochromatism are combined to impart to the display apparent dimensions and visual effects lacking in conventional two-dimensional displays.

A significant feature of the invention is that the process or producing the display may be carried out using serigraphy or silk-screen printing for this purpose whereby several patterns or images may be layered together, yet reveal themselves to an observer viewing the display one at a time. Through controlled combinations of superposed multiple layers affording the respective or combined characteristics of goniochromatism, and retroreflectivity, as well as those of opacity and gloss, using the silk-screen process one gains the advantages of large size display capabilities and cost effectiveness.

Briefly stated, these objects are attained by a display which when illuminated by a light source is adapted to present selectively to an observer colors and images that depend both on the angular position of the observer and on the angular position of the light source relative to the display. The display includes a substrate on which is coated an opaque base layer having a color image printed thereon. Coated over the base layer is an intermediate layer of transparent material having interference pigment particles dispersed therein which impart goniochromatic properties to this layer, the color seen depending on said angular positions. Overlying the intermediate layer is a retroreflectivity layer formed by transparent beads whereby light reflected from the base layer or from the intermediate layer, as seen by the observer, passes through the retroreflectivity layer to enhance the brilliance of the colors or images presented to the observer.

BRIEF DESCRIPTION OF DRAWINGS

For a better understanding of the invention reference is made to the detailed description to follow which is to be read in conjunction with the accompanying drawings of which:

FIG. 7 shows still another angular relationship;

FIG. 8 shows yet another angular relationship; and

FIG. 9 discloses an integrated goniochromatic and retroreflective layer.

DETAILED DESCRIPTION OF INVENTION

Figure 1:
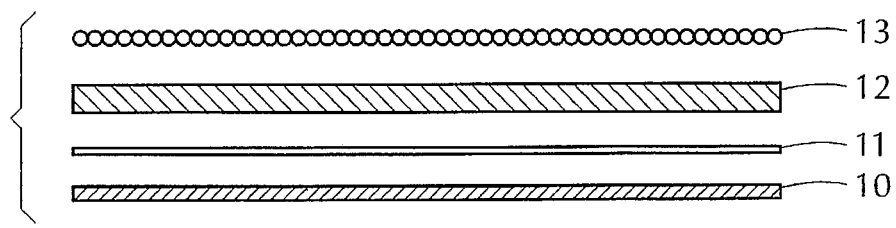
FIG. 1 is a cross section taken through a multi-layer display in accordance with one schematically illustrated embodiment of the invention.

First Embodiment:

FIG. 1 shows a display in accordance with the invention in which several layers are superposed on a substrate. While for purposes of explanation, the layers are shown in spaced relation, in practice the layers are joined together to provide a unitary display.

The display includes a substrate 10 formed of plastic, metal, fabric or other suitable material capable of being coated. Coated on substrate 10 is an opaque base layer 11 having a distinctive color and at least one image or pattern silk-screened or otherwise applied thereto.

Coated over the surface of base layer 11 is a transparent adhesive vehicle or matrix such as a carrier polyacrylic adhesive dissolved in a volatile solvent serving as a carrier. Uniformly dispersed in this vehicle are the fine particles or platelets of an interference pigment, the relative amount of pigment to the adhesive vehicle, by weight, being preferable in the range of 1 to 20%. This coating, when the adhesive cures and hardens, then forms an intermediate layer 12 having goniochromatic properties so that the color one sees when light strikes this layer, depends on the angle of view.

The adhesive vehicle forming intermediate layer 12 is applied to base layer 11 by dipping or spraying, by knife edge application, by silk-screening or by any other known method of creating a clear adhesive layer of uniform thickness.

While layer 12 is still wet and not yet cured and solidified, flocked or otherwise applied to the exposed wet surface of layer 12 are glass or plastic beads whose diameters are preferably in a range of 0.0015 inches to 0.125 inches to form a retroreflective layer 13. The thickness of adhesive layer 12 should be equal to or exceed the diameter of the beads to allow for their proper seating in the adhesive and effective coloration in the retroreflective mode. The beads need not be perfectly spherical, but may be in oblate or other generally round shape.

In practice, the goniochromatic layer 12 having a transparent adhesive and the retroreflective layer formed by glass beads may be integrated as a single coating provided that the refractive index of these beads differs substantially from that of the transparent adhesive vehicle, and in the silk screen application of this coating, the diameter of the beads does not exceed 50% of the mesh opening size.

Figure 2:
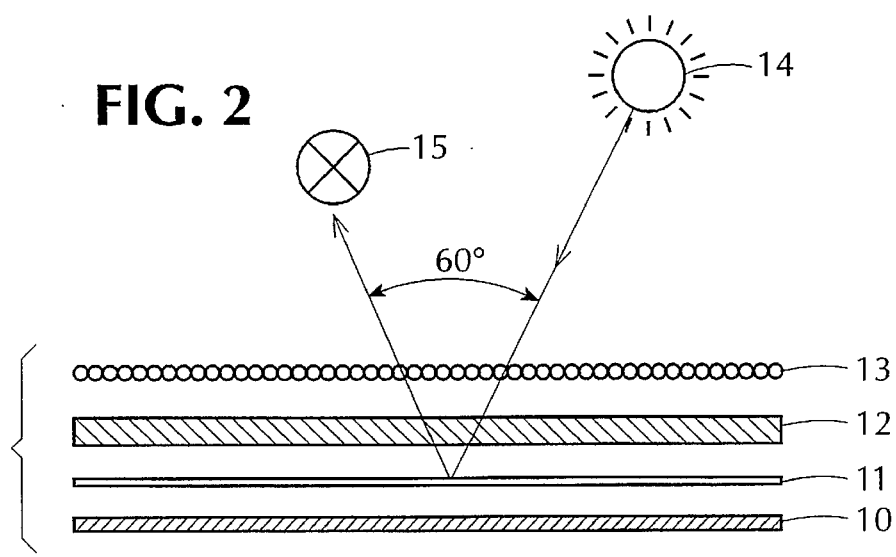
FIG. 2 shows the angular relationships between the display and both the light source illuminating the display and the observer viewing it.
Figure 3:
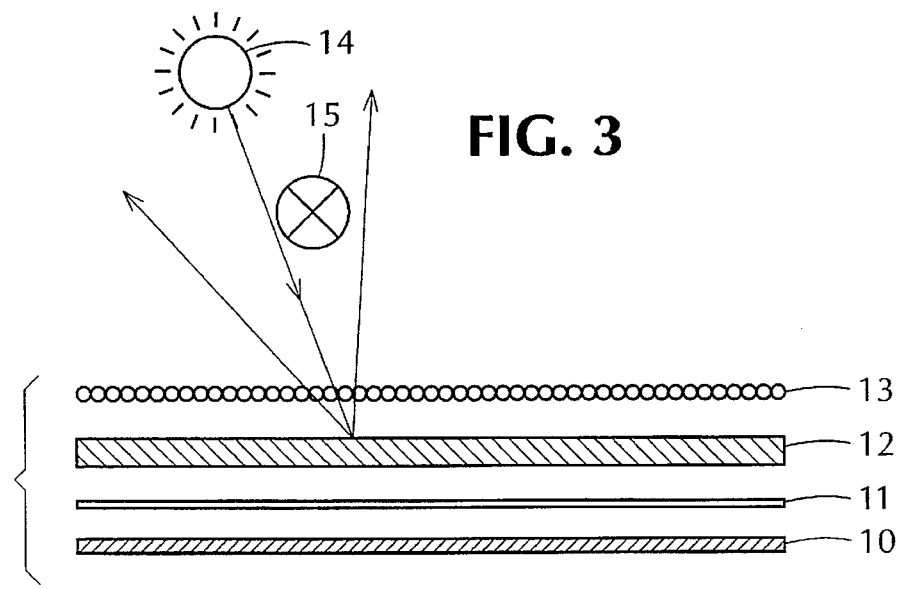
FIG. 3 is the same as FIG. 2, except that it shows different angular relationships.

FIGS. 2 and 3 illustrate different angular relationships between the display shown in FIG. 1, a light source 14 illuminating the display and an observer 15 viewing the display.

As pointed out previously, these angular relationships determine what an observer sees at a given position relative to the light source and the display. Thus in FIG. 2 in which the light source 14 and the observer 15 are angularly displaced about 60 degrees. The rays emanating from light source 14 pass through the retroreflective layer 13 and then through goniochromatic layer 12 to strike the colored image surface of base layer 11 from which it is reflected back toward observer 15. Hence what observer 15 then sees is the colored image which is then visible.

But in FIG. 3, observer 15 is close to being directly in line between light source 14 and the display (within a 30 degree sector), thereby obscuring base layer 11. As a consequence observer 15 then sees the color reflected from the surface of the goniochromatic layer 12, which color depends on the angle of incidence. As the observer shifts his position with respect to the display and the light source, he will at one angular position relative to the display see a color or a colored image differing from that seen at other angular positions. Hence while the display includes retroreflexive and goniochromatic layers in superposed relation, these layers, depending on the angular positions of the observer and the light source relative to the display these layers, act optically in combination or separately.

Figure 4:
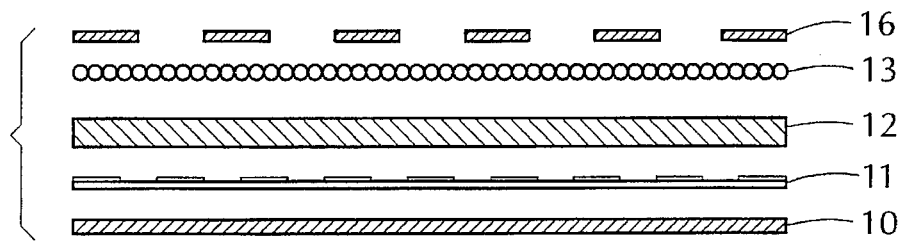
FIG. 4 is a cross section taken through another embodiment of the display.

Second Embodiment:

This embodiment of a display in accordance with the invention shown in FIG. 4 is the same as that shown in FIG. 1 except for the following differences.

Base layer 11 has printed thereon a singe or a multi-colored image. A goniochromatic layer 12 overlies base layer 11 and over layer 12 is a retroreflective layer 13 formed by glass beads or other means. Coated on layer 13 is a clear gloss which containing interference pigment particles (1 to 20% by weight) to create a goniochromatic face layer 16. Face layer 16 appears to an observer primarily as a reflected color, but it should be minimal in coverage so as not to unduly cover the beaded surface of retroreflective layer 13, for this would degrade retroreflective activity.

Figure 5:
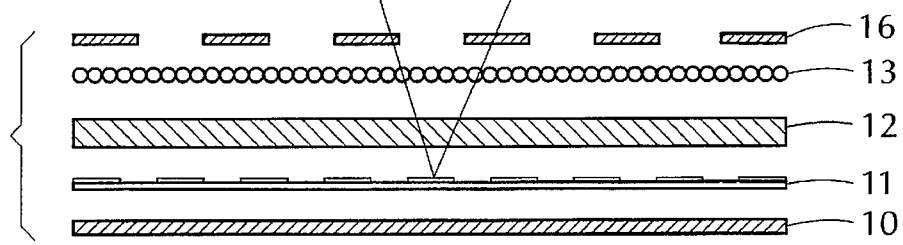
FIG. 5 shows the angular relationships between the display illustrated in FIG. 4, both with respect to a light source and an observer.

Examples:

The manner in which the angular position of the observer and that of the light source relative to the display shown in FIG. 4 affects the impression made by the display on the observer is illustrated by the examples shown in FIGS. 5 to 8. In FIG. 5, the angular relationships are such as to illuminate the single or multiple-color image base layer 11. The observer 15 then sees whatever image is illuminated through the layers 12, 13 and 16 above base layer 11.

Figure 6:
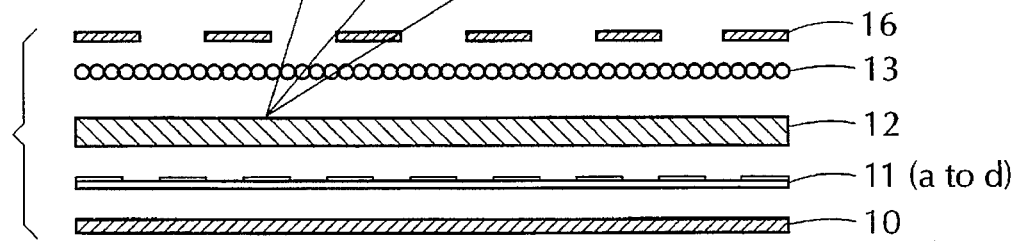
FIG. 6 shows another angular relationship.

FIG. 6 illustrates how the retroreflective layer 13 allows the goniochromatic layer 12, when the display is illuminated by light source to become visible to observer 15 when he is close to being in direct line between light source 14 and the surface of the display (within a 30 degree sector).

FIG. 7 shows how the surface layer 16 is perceived by observer 15 who sees light reflected from this layer emanating from light source 14 which is angularly displaced from the observer almost 90 degrees. This light then has the color imparted thereto by the goniochromatic properties of the surface layer 16.

FIG. 8 illustrates what an observer sees as he walks from on side to the other side of the display and in doing so establishes a different angular relationship with light source 14 and the surface of the display. The three observer positions are indicated by numerals $15^I$, $15^{II}$ and $15^{III}$.

In position $15^I$ the observer sees the color reflected from surface layer 16. In position $15^{II}$ he sees through layers 16, 13 and 12 the image on base layer 11 (a to d). And in position $15^{III}$ in which the observer is nearly in direct line with light source 15 (within a 30 degree sector), the observer then sees the color of goniochromatic layer 12 which remains brightly visible through the retroreflective layer 13 until the observer passes beyond the 30 degree range of effectiveness. The luminousity or brilliance of the light seen by an observer is hightened by the retroreflective layer.

Thus with a display in accordance with the invention, what the viewer sees in terms of luminosity, color, pattern and image depends on his changing position. By presenting more than one color, pattern or image to a passing viewer, the illusion of an extra dimension is created, giving the observer a distinct impression of multi-dimensionality and change.

Modifications:

The invention is not limited to discrete displays, for one may provide a multi-layer wall, floor or ceiling for a room in which the substrate of the display is a plastic, paper, fabric or other sheeting adhered to the wall or other surface to be covered. The display in this instance provides passive lighting which enhances whatever artificial or ambient light is available in the room. Fabric may also be treated to have a multi-layer display integrated with the fabric.

And the display need not be two dimensional but may be three dimensional.

And the use of glass or other beads to create a retroreflective layer is not essential to the invention, for a retroreflective layer can be formed by a synthetic plastic transparent film or sheet having an array of multi-faceted indentations stamped or molded thereon to impart retroreflective properties to the sheet. Or these retroreflective indentations may be stamped into the matrix of the goniochromatic layer before it is cured, thereby fully integrating the retroreflective and goniochromatic layer into a unitary layer.

Thus as shown in FIG. 9, the retroreflective layer 17 is formed by a transparent plastic sheet whose inner surface is indented to impart retroreflective properties to this layer, the inner side being coated with a clear plastic material having interference pigment dispersed therein to create a layer 18 having goniochromatic properties.

In practice, the integrated layer need not be in sheet form but may be in plaque form.

The goniochromatic layer may not only include particles of interference pigment dispersed in the transparent matrix, but also particles of standard pigments. Hence depending on the angle of view, the observer will see through the retroreflective layer the color of the standard pigments dispersed in the goniochromatic layer or the color of the interference pigment emanating from this layer.

And one may in practice provide a more complex display, by coating over the high gloss goniochromatic face layer 16 shown in FIG. 4, another retroreflective layer, and coating over this layer still another gloss layer to create a multiply laminate of goniochromatic and retroreflective layers.

One need not include images in the display for the display can be tailored to present only different colors so that an observer depending on his angle of view and that of the light source, will see coming through the retroreflective layer the color of the substrate or the color emanating from the goniochromatic layer, or both colors. And instead of coating substrate 10 with an opaque color layer, the substrate material be formed of a colored material.

While there has been shown a multi-color, multi-image display in accordance with the invention, it will be appreciated that many changes may be made therein without departing from the spirit of the invention.

I claim:

1. A planar display which when illuminated by a light source is adapted to present selectively to an observer colors that depend both on the angular position of the source and that of the observer relative to the display, said display comprising:

A. an opaque substrate coated with a base layer, presenting a distinctive color having an image applied thereto;

B. an intermediate layer overlying the substrate constituted by a transparent matrix having dispersed therein particles of interference pigment to render the intermediate layer goniochromatic whereby when light rays from the source are incident to the intermediate layer, the reflected rays then have a color which depends on the angle at which light rays strike the interference pigment; and C. a retroreflective layer overlying said intermediate layer, whereby when light rays form the source incident to the retroreflective layer are reflected thereby, these rays then return along parallel paths, and depending on said angular position of said source and that of the observer relative to the display, the light rays will either pass both through the intermediate and retroreflective layers and the observer will see the image on the substrate, or the light rays will only pass through the retroreflective layer and the observer will then see a color emanating from the goniochromatic intermediate layer.

2. A display as set forth in claim 1, in which the image is silk-screened on the base layer.

3. A display as set forth in claim 1, in which the transparent matrix of the intermediate layer is formed by a transparent adhesive.

4. A display as set forth in claim 1, in which the adhesive is an acrylic.

5. A display as set forth in claim 1, in which the retroreflective layer is formed by glass or plastic beads.

6. A display as set forth in claim 1, further including a face layer formed on said retroreflective layer, said face layer having goniochromatic properties.

7. A display as set forth in claim 1, in which the ratio of said particles to said transparent matrix by weight is in the range of 1 to 20%.

8. A display as set forth in claim 1, in which also dispersed in said matrix are particles of a standard pigment.

9. A display as set forth in claim 1, in which said intermediate layer is formed on said substrate by a flowable transparent adhesive vehicle having said particles dispersed therein, said matrix being formed when the vehicle hardens.

10. A display as set forth in claim 9, in which said retroreflective layer is formed by a layer of glass or plastic bead applied to the surface of said adhesive vehicle while it is still flowable and before it hardens.

11. A display as set forth in claim 9, in which said retroreflective layer is formed by multi-faced indentations impressed in said vehicle before it hardens.

* * * * *